United States Patent [19]

Sharp et al.

[11] 4,350,600
[45] * Sep. 21, 1982

[54] METHOD AND COMPOSITION FOR INHIBITING CORROSION IN HIGH TEMPERATURE, HIGH PRESSURE GAS WELLS

[75] Inventors: Shelby P. Sharp, Tulsa, Okla.; Lyman Yarborough, Naperville, Ill.

[73] Assignee: Standard Oil Company (Indiana), Chicago, Ill.

[*] Notice: The portion of the term of this patent subsequent to Feb. 3, 1995, has been disclaimed.

[21] Appl. No.: 43,298

[22] Filed: May 29, 1979

[51] Int. Cl.$^3$ ............................................. E21B 41/02
[52] U.S. Cl. ............................ 252/8.55 E; 166/244 C; 252/391
[58] Field of Search ..................... 252/8.55 B, 8.55 E, 252/390; 299/4, 5; 166/312, 244 C

[56] References Cited

U.S. PATENT DOCUMENTS

| | | | |
|---|---|---|---|
| 2,598,213 | 5/1952 | Blair | 252/8.55 |
| 3,314,999 | 4/1967 | Bapseres et al. | 260/608 |
| 3,623,979 | 11/1971 | Maddox et al. | 252/8.55 |
| 3,687,847 | 8/1972 | Maddox et al. | 252/8.55 |
| 3,846,311 | 11/1974 | Sharp et al. | 252/8.55 |

OTHER PUBLICATIONS

Brown et al., Article in *The Oil and Gas Journal*, vol. 57, No. 44, Oct. 26, 1959, pp. 73–78.
Tuttle et al., "Deep Wells–A Corrosion Inhibiting Challenge", Paper No. 94, presented at the International Corrosion Forum, Apr. 14–18, 1975, held at Toronto, Ontario.
Kirk–Othmer, Encyclopedia of Chemical Technology, Third Ed., vol. 2, pp. 283–295.

*Primary Examiner*—Herbert B. Guynn

[57] ABSTRACT

A relatively nonvolatile, high molecular weight corrosion inhibitor and inhibitor carrier produced by activating a dialkyl disulfide oil by the addition of a relatively high molecular weight aliphatic amine (e.g., a fatty amine, particularly the N-alkyl-1,3-propane diamines) and optionally further increasing the molecular weight by the addition of elemental sulfur, which exhibits corrosion inhibition on its own and in combination with a conventional oil base corrosion inhibitor additive. Such a composition is particularly useful in sustaining a liquid film forming phase at bottomhole conditions for high temperature, high pressure gas wells wherein essentially no petroleum condensate phase exists.

7 Claims, 2 Drawing Figures

METHOD AND COMPOSITION FOR INHIBITING CORROSION IN HIGH TEMPERATURE, HIGH PRESSURE GAS WELLS

BACKGROUND OF THE INVENTION

1. Field of the Invention

The present invention relates to an improved corrosion inhibitor system and a method for using this corrosion inhibitor in gas wells. More specifically, it is concerned with a high molecular weight amine activated dialkyl disulfide oil optionally containing dissolved elemental sulfur and/or an oil-soluble corrosion inhibitor which is capable of maintaining a protective film at high temperature, high pressure bottomhole conditions in the absence of petroleum condensate phase.

2. Description of the Prior Art

The utilization of chemical corrosion inhibitors to protect metal surfaces in various stages of oil and gas production has long been recognized as a necessary feature of oil and gas production. During the past half century multitudes of chemical corrosion systems and methods of using them have been developed and have led to a vast number of patents and technical literature references. Thus, today, corrosion engineering is considered an integral part of the planning and operation of virtually every stage of oil and gas production.

With ever increasing world energy demands and the advent of international fuel shortages, the oil and gas industry has been forced to drill deeper and deeper into more hostile environments in search of critically needed fuel. As a result, certain high temperature, high pressure deep horizon gas fields have been discovered throughout the world, which present a severe challenge to contemporary corrosion technology when one attempts to produce large volumes of natural gas from these fields.

The gas wells of particular interest in the present invention are characterized by a combination of properties that lead to corrosion rates many fold higher than experienced in other gas fields. First and foremost, the gas wells are completed at great depths which in many cases exceed 20,000 feet. Consequently, the gas wells are categorically high temperature, high pressure wells. As a general rule of thumb at bottomhole temperatures in excess of 250° F. and bottomhole pressures of the order of 4,000 psi, one can anticipate severe corrosion. As these bottomhole temperatures and pressures increase, the problem becomes even more pronounced such that at about 400° F. and pressures in excess of 5,000 psi, the use of many corrosion inhibiting systems and methods in virtually prohibited. The gas wells of interest in the present invention are of this nature.

Furthermore, the particular gas wells of interest are dry wells in the sense that no liquid petroleum phase exists at the bottomhole conditions. Thus no protective oil film will be present to coat the casing and to act as a corrosion inhibitor carrier. In fact, since no condensate phase exists at these bottomhole conditions, injection of oil-soluble inhibitors in a petroleum condensate carrier will be ineffective because of premature vaporization of the carrier before reaching the bottom of the well. To further complicate the lack of a petroleum condensate phase at the bottomhole conditions, the gas wells of interest will have an aqueous or brine phase present, and this in combination with acid gases such as hydrogen sulfide, carbon dioxide or the like, create an extremely corrosive environment. With gas production in terms of tens of millions of standard cubic feet per day, the possibility of maintaining an oil condensate phase at bottomhole conditions is for all pragmatic purposes ruled out.

In an article entitled "Deep Wells-A Corrosion Engineering Challenge" by R. N. Tuttle and T. W. Hamby, presented at the International Corrosion Forum, Apr. 14 through 18, 1975, held at Toronto, Ontario, it was acknowledged that the recent emphasis on deep high temperature, high pressure horizons as potential gas producers and the associated hostile environments encountered presents a severe challenge to contemporary technology. In the article it was pointed out that bottomhole temperatures as high as 550° F. have been encountered in South Texas and bottomhole pressures exceeding 22,000 psi are present in Mississippi. It was also pointed out that tubing failure caused by corrosion in deep wells has been experienced in as little as eight months in the Lacq field in France, Germany, Austria, and also Mississippi. The Thomasville-Piney Woods field near Jackson, Mississippi, is exemplified as involving gas wells that fit the above description and have severe corrosion problems. The False River field in Louisiana is believed to contain gas wells that would involve bottomhole conditions characteristic of the present invention. The article concludes with an admission that a new corrosion inhibiting system to cover flowing conditions in the range of 18,000 to 20,000 psi and 380° to 450° F. is needed for completion of anticipated future wells in South Texas and Mississippi.

SUMMARY OF THE INVENTION

In view of the severe corrosion problems encountered in gas wells producing from very deep high pressure and high temperature horizons wherein no petroleum condensate phase exists at bottomhole conditions but an aqueous or brine phase is present, we have developed a method for inhibiting corrosion in such wells involving the steps of:

(a) producing a corrosion inhibiting composition capable of existing in a liquid phase at said bottomhole conditions comprising a dialkyl disulfide to which has been added a high molecular weight fatty amine in quantities in excess of about 30 parts by weight fatty amine per 100 parts by weight dialkyl disulfide, and (b) injecting said corrosion inhibiting composition into said gas well to inhibit corrosion.

In one aspect of the present invention, elemental sulfur is added to the corrosion inhibiting composition prior to injection into the gas well in order to further increase the molecular weight and decrease the volatility of the composition thus insuring the presence of a liquid phase at bottomhole conditions. In another aspect, a small but effective amount of an oil soluble or oil compatible corrosion inhibitor is added to the corrosion inhibiting composition prior to injection into the gas well. In all aspects, the present invention provides a new corrosion inhibiting composition effective in maintaining a protective film at hostile bottomhole conditions. The corrosion inhibiting composition involves adding a high molecular weight fatty amine to a dialkyl disulfide thus producing a heavy oil capable of existing in a liquid phase at bottomhole conditions. An effective amount of an oil soluble corrosion inhibitor can be incorporated into the heavy oil to produce new inhibiting compositions.

Thus, the primary objective of the present invention is to provide a new film forming heavy oil wherein the volatility of the oil can be tailored according to the needs of the particular gas wells to be treated and which is compatible with conventional oil base corrosion inhibitors such that injection of small volumes of heavy oil/inhibitor into the gas well wherein a petroleum condensate phase does not exist will result in a protective corrosion inhibiting liquid phase. In other words, the primary objective of the present invention is to provide an alternate corrosion inhibitor carrier that will perform in high temperature, high pressure gas wells without condensate in a manner analogous to the performance of an oil condensate/inhibitor system in a gas well containing a liquid petroleum phase.

DESCRIPTION OF PREFERRED EMBODIMENTS

Figure 1:
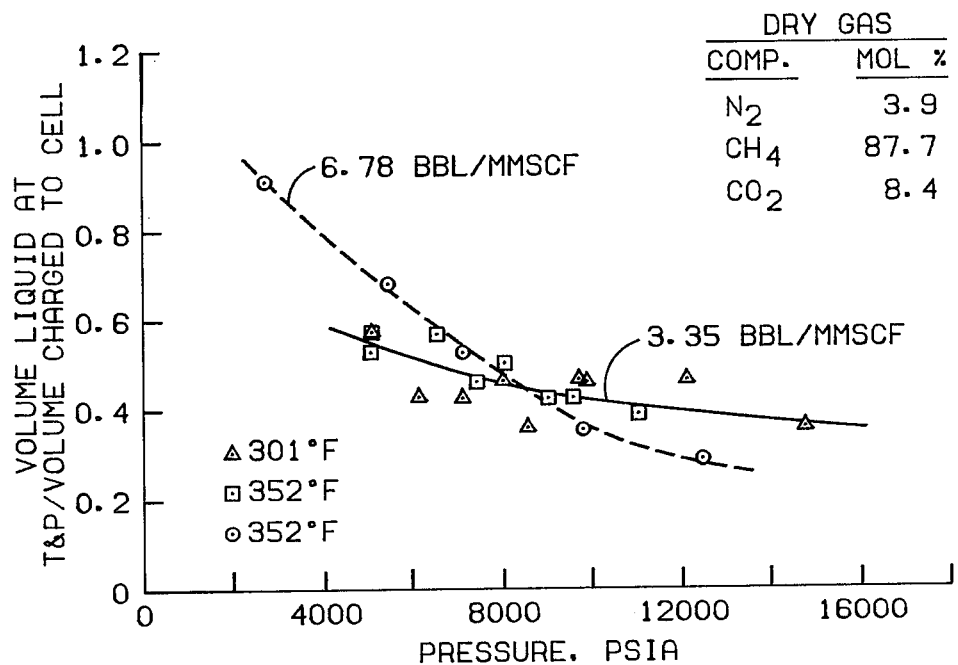
FIG. 1 of the drawing illustrates the volume factor as a function of pressure for Duomeen ® T activated dialkyl disulfide oil at two temperatures and two dry gas flow rates when 149 grams of Duomeen T are added per 50 grams of disulfide oil.

Upon recognition of the severe corrosion problems associated with the aforementioned types of gas wells and the realization that the lack of a protective film forming condensate phase at bottomhole conditions is the cause of the problems, only a limited number of alternatives are available aside from capping the well and stopping production. Each of these alternatives is in some way less than fully acceptable. Since there is an aqueous phase present at bottomhole conditions, the use of a water soluble corrosion inhibitor is one alternative. However, the protective film forming characteristics of an aqueous phase is acknowledged as inferior to that of an oil film, and this in combination with high gas flow rates characteristically in excess of 10 MMSCFD (million standard cubic feet per day) makes the use of a water corrosion inhibitor system ineffective. Since the oil condensate phase is nonexistent at bottomhole conditions, conventional addition of an oil soluble corrosion inhibitor dissolved in an oil carrier is virtually impossible. However, overdisplacing the gas well with large volumes of oil containing an oil based inhibitor is another alternative. Such an alternative is expensive in that very large volumes are required which in turn reduce gas production rate and require expensive oversized equipment to achieve the necessary injection rates. Less volatile heavy oils have been employed in the overdisplacement techniques to partially offset the extremely large volumes. It has also been suggested that more expensive exotic noncorrosive metals be employed. And more frequent pulling and replacement of production tubing has been implemented. But as of now, none of the alternatives or combinations of alternatives have proven to be equivalent of what would be expected if an oil condensate phase could be maintained at bottomhole conditions. The previously referenced R. N. Tuttle, et al, article summarizes an ideal solution to the problem in the following way, "A simpler approach would be to use a heavy oil which would provide a high dew-point pressure at low concentrations in the mixed gas/oil inhibitor phase (if one can be found)."

The present invention is such a system. We have discovered that when a high molecular weight fatty amine is used to activate dialkyl disulfide and when a sufficient quantity of this fatty amine is incorporated into the dialkyl disulfide, a heavy oil results which is capable of existing in a liquid phase at bottomhole conditions characteristic of the dry gas wells of interest. This heavy oil is found to be an effective corrosion inhibitor as well as an effective oil base corrosion inhibitor carrier with excellent film forming properties. Thus, such compositions are extremely useful in suppressing corrosion in the very hostile environments of interest. It is believed that the high molecular weight fatty amine is chemically incorporated into the dialkyl disulfide thus creating the desired high molecular weight and associated low volatility necessary to create a liquid phase at bottomhole conditions. Accordingly, a liquid phase has been observed at high temperatures high pressures in the presence of what corresponds to high gas flow rates even though relatively small quantities of the corrosion inhibiting composition were employed. To further decrease the volatility and to insure the presence of a liquid phase, elemental sulfur can be incorporated into the high molecular weight amine activated dialkyl disulfide producing an alkyl polysulfide heavy oil which retains the corrosion inhibitor and corrosion inhibitor carrier properties.

Preparation of the corrosion inhibiting compositions according to the present invention can be accomplished in a variety of manners provided certain key features are present. In principle, the compositions are made of two necessary constituents with the possibility of two additional constituents. The first necessary constituent is selected from a class of compounds or mixture of compounds referred to as dialkyl disulfides. The second necessary constituent is selected from a class of compounds recognized as fatty amines which are capable of being chemically incorporated into the dialkyl disulfide thus producing an amine activated dialkyl disulfide that is sufficiently nonvolatile at bottomhole conditions to produce a liquid phase. The two additional constituents are sulfur to further increase the molecular weight and decrease the volatility of the oil and an oil based corrosion inhibitor to further suppress corrosion.

The dialkyl disulfide useful as starting materials in preparing the corrosion inhibitors of the present invention can be viewed as involving a pair of alkyl radicals (R and R') bonded to a disulfide unit as represented in the formula R-S-S-R'. Such compounds are also referred to in chemical literature as alkyl disulfides, thus the terms should be considered equivalent for the purposes of this invention. The dialkyl disulfides include such compounds as dimethyl disulfide, diethyl disulfide, dioctyl disulfide, ditertiary tetradecyl disulfide, and the like. One particularly useful starting material is a mixture of aliphatic disulfides in which the aliphatic group therein contains from 2 to about 11 carbon atoms; e.g., $(C_2H_5S)_2$, $(C_{11}H_{23}S)_2$, etc., typically those disulfide mixtures produced as a product stream from the Merox process described in *The Oil and Gas Journal*, Vol 57, pp. 73–78, Oct. 26, 1959. Such mixtures of disulfides are produced by first contacting a refinery hydrocarbon stream containing aliphatic mercaptans with a caustic solution to produce corresponding sodium salt of the mercaptans. The latter are then converted to dialkyl disulfides by air oxidation, simultaneously regenerating the caustic.

The addition of the high molecular weight essentially aliphatic amine (fatty amine) in order to produce the high molecular weight relative nonvolatile corrosion inhibitor composition of the present invention is somewhat analogous to the known lower alkyl amine activation of dialkyl disulfides in order to produce sulfur solvents. Examples of such processes are described in U.S. Pat. Nos. 3,314,999 and 3,846,311 and are here incorporated by reference as being descriptive of the alternate methods of activating the dialkyl disulfide with an amine. In the U.S. Pat. No. 3,314,999 patent a method for increasing the quantity of dissolved sulfur in a dialkyl disulfide sulfur solvent is described involving the addition of a lower aliphatic amine (an alkyl amine having 1 to 7 carbon atoms) at very low concentrations (0.04 to 5.0 weight percent) at a temperature between 0° C. and the boiling point of the dialkyl disulfide. In the U.S. Pat. No. 3,846,311 patent, a method for achieving ultra-high sulfur dissolving capacity is described involving the addition of up to 10% by weight of a normally liquid saturated unsubstituted aliphatic amine containing 4 to 12 carbon atoms to a dialkyl disulfide and then aging this mixture to achieve the desired sulfur solvency. Although these methods are descriptive of the amine activation of the dialkyl disulfide of the present invention, several critical differences exist. By far the most important distinction is that the compositions produced in the prior art are incapable of sustaining a liquid phase at the conditions characteristic of the gas wells of interest, whereas the compositions of the present invention do exist in a liquid phase under the same conditions. This phase behavior difference is a consequence of the composition distinctions involved in preparing the amine activated dialkyl disulfide. Specifically, the amine used in the present invention is a high molecular weight amine having in excess of 12 carbon atoms in the aliphatic moiety. Also, the amine is incorporated into the dialkyl disulfide at a concentration level far in excess of what has previously been employed.

The high molecular weight amines or fatty amines useful in the present invention are in principle long chain alkyl amines usually synthesized from naturally occurring fatty acids wherein the alkyl group involved contains 12 or more carbon atoms. The commercial available fatty amines will contain mixtures of alkyl chain lengths since they are derived from fatty acids occurring in nature. Frequently this will also result in an abundance of the even carbon numbered species and the presence of unsaturation such as found in the oelic, palmitic, and the like structures. However, any long chain predominantly aliphatic amine, whether it be a single species with either even or odd numbered carbon atoms or mixtures of these species, is viewed as an acceptable high molecular weight amine for purposes of this invention. These fatty amines are preferably waxy solids or semi-solids which are easily melted at temperatures characteristic of the gas wells of interest. The preferred amines will involve carbon chain links of 16 through 30 carbon atoms. This preferred range is consistent with the present view that increasing the molecular weight in order to decrease volatility is of paramount importance in achieving the desired liquid phase at bottomhole high temperatures and high pressures. In cases where the fatty amine is a liquid at room temperatures (i.e., fatty amines having alkyl chain links predominantly at the lower end of the acceptable range; e.g., approaching $C_{12}$). The addition of elemental sulfur to the amine activated dialkyl disulfide may be necessary to achieve the desired high molecular weight heavy oil which is capable of existing as a liquid film forming phase at the severe conditions of interest. A subclass of fatty amines which have been found to be particularly useful in the present invention is the N-alkyl-1,3-propane diamines. For a more complete discussion of the high molecular weight aliphatic amines, the respective chemical identities, commercial sources, physical and chemical properties, known uses, and methods of synthesis, the FATTY AMINES chapter starting on page 283 of the 3rd Edition, Volume 2 of the KIRK-OTHMER, "Encyclopedia of Chemical Technology" is here incorporated by reference.

Although the prior art teaches the use of lower alkyl amines to activate the dialkyl disulfide and views the $C_4$ through $C_{12}$ alkyl amines as uniquely suitable for such purposes, we now believe that any aliphatic amine can be chemically incorporated into the dialkyl disulfide according to what appears to be a specific chemical reaction common to all aliphatic amines and dialkyl disulfides. This belief is in part based on the present discovery that fatty amines when added to the dialkyl disulfide appreciably affect the phase behavior at high temperatures and pressures implying chemical bonding and in part to the experimental evidence relating to monitoring the vapor pressure of the aliphatic amine during the amine activation of the dialkyl disulfide (when employing an amine that has a detectable vapor pressure; e.g., diethylamine). It has been observed that when monitoring the vapor pressure of diethylamine during activation of the Merox ® mixture at low concentrations the vapor pressure initially increases during heating and then drops off to a very low value indicative of the amine being chemically reacted with the dialkyl disulfide. By repeating this procedure at incrementally increasing quantities of amine, it has been observed that an apparent two moles of dialkyl disulfide per one mole of nitrogen amine is the upper stoichiometric quantity of amine being incorporated into the amine activated dialkyl disulfide. Under previous conditions, when using the lowest molecular weight aliphatic amines and dialkyl disulfides, this upper stoichiometric ratio roughly corresponds to 10% by weight amine as acknowledged in the previous patent literature.

In practicing the present invention, although it is believed that achieving the full stoichiometric incorporation of amine nitrogen is desirable, significant liquid phase has been observed at high temperatures and high pressures with as little as approximately 50% stoichiometric quantities of fatty amines. Using the Merox mixture, 50% stoichiometry corresponds to about 30 to 45 parts by weight high molecular weight amine per 100 parts by weight dialkyl disulfide, depending on the particular molecular weight of the amine. Furthermore, the desired liquid phase has been observed at bottomhole conditions at amine concentrations ten-fold of the lower values (300 parts by weight amine per 100 parts by weight dialkyl disulfide), certainly in excess of the believed stoichiometry.

In order to confirm the presence of the necessary liquid film forming phase at high temperatures and pressures, a series of phase distribution tests in a variable volume windowed PVT cell were performed. Table I presents the data related to the preparation of fatty amine activated dialkyl disulfide oils, some of which were used during the phase distribution tests.

TABLE I

| Sample | Weight of Disulfide[1] Oil, gms | Weight of Fatty Amine[2] gms | Weight of Sulfur gms | Maximum Temperature to Dissolve Sulfur | Weight of Wet Sulfur When Cooled to 76° F., gms |
| --- | --- | --- | --- | --- | --- |
| 1 | 100 | 14.7 | 260 | 200 | 165.2 |
| 2 | 100 | 14.9 | 100 | 200 | 0 |
| 3 | 100 | 14.7 | 110 | 300 | 12.6 |
| 4 | 50 | 149.0 | 60 | 200 | 0 |
| 5 | 50 | 149.0 | 0 | 200 | — |
| 6 | 100 | 45.1 | 0 | 200 | — |

[1] N-alkyl-1,3-propane diamine ($RNHCH_2CH_2CH_2NH_2$) wherein the alkyl group (R) is derived from tallow having an average carbon number of about 18, sold under the trade name Duomeen® T by Armak.
[2] Merox® disulfide oil produced by Warren Petroleum Company at their Baytown Plant.

In preparing the five amine activated dialkyl disulfide oils of Table I, the quantity of fresh dialkyl disulfide oil, as specified in the second column, was placed in a 500 ml reaction flask to which was then added the respective amount of fatty amine as found in the third column. Because of insufficient available volume in the 500 ml reaction flask, the weight of the reactants in the Samples 4 and 5 were reduced by a factor of two. The particular disulfide oil employed was a Merox mixture of dialkyl disulfides produced at Warren Petroleum's Baytown Plant. A typical compositional distribution of such a Merox mixture is illustrated in Table II.

TABLE II

| Component | Weight Percent | Mol Percent |
| --- | --- | --- |
| Diethyl Disulfide | 9.0 | 13.44 |
| Dipropyl Disulfide | 13.3 | 16.15 |
| Dibutyl Disulfide | 32.5 | 33.26 |
| Dipentyl Disulfide | 33.9 | 29.97 |
| Dihexyl Disulfide | 8.5 | 6.62 |
| Diheptyl Disulfide | 0.85 | 0.56 |

The particular fatty amine employed to activate the dialkyl disulfide mixture was a N-alkyl-1, 3 propane diamine supplied by Armak of Chicago under the trade name Duomeen T. This fatty amine is described as a N-tallow-1, 3-propane diamine having the general formula; $RNHCH_2CH_2NH_2$. The compositional distribution of a typical mixture of alkyl radicals (the R in the above formula) and some typical properties of this fatty amine is presented in Table III.

TABLE III

Typical Properties of Duomeen® T

| Alkyl Chain Length Distribution | (%) | Apparent Molecular Weight | B.P. °C. | M.P. °F. | Specific Gravity (25° C.) | Iodine Value Min. | Iodine Value Max. |
| --- | --- | --- | --- | --- | --- | --- | --- |
| Dodecyl $C_{12}$ | 1.0 | 350 | 300 | 195 | 0.841 | 32 | 45 |
| Tetradecyl $C_{14}$ | 3.0 | | | | | | |
| Pentadecyl $C_{15}$ | 0.5 | | | | | | |
| Hexadecyl $C_{16}$ | 29.0 | | | | | | |
| Septadecyl $C_{17}$ | 1.0 | | | | | | |
| Octadecyl $C_{18}$ | 23.0 | | | | | | |
| Tetradecenyl $C'_{14}$ | 1.0 | | | | | | |
| Hexadecenyl $C'_{16}$ | 3.0 | | | | | | |
| Octadecenyl $C'_{18}$ | 37.0 | | | | | | |
| Octadecadienyl $C''_{18}$ | 1.5 | | | | | | |

In preparing the various samples in Table I, three different relative amounts of fatty amine per 100 grams of dialkyl disulfide oil were selected such as to reflect below stoichiometric amount, stoichiometric amount and excess of stoichiometric amount of amine. Since the particular fatty amine employed has two amine nitrogens and since each is believed to be chemically active in promoting dialkyl disulfide oils according to what has alredy been described as a reaction involving two mols of dialkyl disulfide per 1 mol of nitrogen amine, the Samples 1, 2, and 3 represent what is believed to be approximately ⅛ stoichiometric amount of amine, while Samples 4 and 5 represent over 6 times stoichiometric amine, and Sample 6 represents stoichiometry.

Samples 1 through 4 were further tested by the addition of a pulverized elemental sulfur. The data found in the last three columns of Table I clearly establish that the fatty amine activated dialkyl disulfide oil acts as a sulfur solvent. The sulfur solvent properties are extremely analogous to what has been previously known relative to the promotion of the sulfur solvency of dialkyl disulfides by the use of lower molecular weight amines.

In order to verify the presence of the liquid phase at high pressures and high temperatures, characteristic of the bottomhole conditions of the wells of interest in the present invention, Samples 5 and 6 of Table I were selected for testing in the presence of a dry gas in a high pressure variable volume PVT windowed cell. Initially, the PVT cell was charged with 2.83 cc of Duomeem T activated disulfide oil (Sample 5) at 1,500 psia and 90° F. (32.2° C.) and 6.346 gm mols of a gas having a composition of Table IV.

TABLE IV

| Component | Mol Percent |
| --- | --- |
| $N_2$ | 3.9 |
| $CH_4$ | 87.7 |
| $CO_2$ | 8.4 |

This particular composition corresponds to 3.35 barrels of amine activated dialkyl disulfide oil being injected into a dry gas well per million standard cubic feet of dry gas being produced from the well (Bbl/MMSCF). The PVT cell was held at 301° F. (149° C.) while the volume was varied such that the pressure in the cell ranged from approximately 5,000 psia up to 15,000 psia and then back to 5,000 psia. The total volume of the cell and the volume of the liquid phase present in the cell were recorded at various pressures and are presented in Table V and FIG. 1.

The temperature of the PVT cell was then elevated to 352° F. (178° C.) and the volume again varied such that the pressure ranged from approximately 5,000 psia up to 11,000 psia and then back to 5,000 psia. The total volume and the volume of the liquid phase as a function of pressure for this temperature are also presented in Table V and FIG. 1.

Finally, an additional run involving 5.72 cc of Duomeen T activated dialkyl disulfide (Sample 5) being charged into the PVT cell at 1,500 psia and 95° F. (35° C.) along with 6.346 gm mols of the gas from Table IV was performed. The composition involved in this run corresponds to 6.78 Bbl/MMSCF. The temperature was again held at 352° F. (178° C.) while the pressure ranged from approximately 2,700 psia up to 13,000 psia. Again the data is presented in Table V and FIG. 1. In discussing the significance of this data, it should be emphasized that there are at least two distinct compositional effects or features involved. The first is the overall gas to liquid ratio and the second is the amine to disulfide oil ratio.

TABLE V

Phase Distribution Test Results for Duomeen T Activated Dialkyl Disulfide Oil With Dry Gas at 301 and 352° F.; 149 gm Duomeen T/50 gm Dialkyl Disulfide Oil

| Pressure, psia | Total Volume, cc | Liquid Volume, cc | Volume Percent Liquid | Volume Liquid at T & P per Volume Oil Charged |
|---|---|---|---|---|
| 3.5 Bbl Oil/MMSCF Gas 301° F. | | | | |
| 5,058 | 684.30 | 1.6 | 0.23 | 0.565 |
| 6,111 | 594.25 | 1.2 | 0.20 | 0.425 |
| 7,078 | 538.18 | 1.2 | 0.22 | 0.425 |
| 8,541 | 479.61 | 1.0 | 0.21 | 0.354 |
| 9,848 | 443.76 | 1.3 | 0.27 | 0.460 |
| 12,076 | 400.82 | 1.3 | 0.32 | 0.460 |
| 14,720 | 365.80 | 1.0 | 0.27 | 0.354 |
| 9,680 | 447.30 | 1.3 | 0.29 | 0.460 |
| 8,000 | 497.95 | 1.3 | 0.26 | 0.460 |
| 5,067 | 683.46 | 1.6 | 0.23 | 0.565 |
| 352° F. | | | | |
| 5,070 | 742.93 | 1.6 | 0.22 | 0.565 |
| 6,530 | 613.78 | 1.6 | 0.26 | 0.565 |
| 8,046 | 534.71 | 1.4 | 0.26 | 0.495 |
| 9,507 | 483.80 | 1.2 | 0.25 | 0.425 |
| 11,001 | 444.16 | 1.1 | 0.25 | 0.388 |
| 8,960 | 498.41 | 1.2 | 0.24 | 0.425 |
| 7,394 | 559.33 | 1.3 | 0.23 | 0.460 |
| 5,054 | 740.43 | 1.5 | 0.20 | 0.530 |
| 6.78 Bbl Oil/MMSCF Gas 352° F. | | | | |
| 2,698 | 1,299.98 | 5.2 | 0.40 | 0.908 |
| 5,540 | 695.36 | 3.9 | 0.56 | 0.681 |
| 7,092 | 582.70 | 3.0 | 0.51 | 0.524 |
| 9,780 | 477.96 | 2.0 | 0.42 | 0.350 |
| 12,399 | 421.21 | 1.6 | 0.38 | 0.280 |

As indicated in the third column of Table V, a significant amount of liquid phase was present through the entire pressure range at all tested conditions. This establishes that the critically needed liquid phase will exist at bottomhole conditions. The fifth column represents the ratio of volume of liquid at the specified temperature and pressure per volume of amine activated dialkyl disulfide injected. Such data is of practical importance for designing a commercial well treatment in that it quantitatively reflects the relative volume of liquid phase remaining at various pressures (depths) in the well then 3.5 and 6.78 Bbls of oil are injected per MMSCF of dry gas produced.

A second phase distribution test was performed using the Duomeen T activated dialkyl disulfides of Sample 6 in Table I. The PVT cell was charged with 3.10 cc of Sample 6 at 1,600 psia and 100° F. (38° C.) along with 6.901 gm mols of a dry gas having a composition of Table VI.

TABLE VI

| Component | Mol Percent |
|---|---|
| $N_2$ | 4 |
| $CH_4$ | 87 |
| $CO_2$ | 9 |

Figure 2:
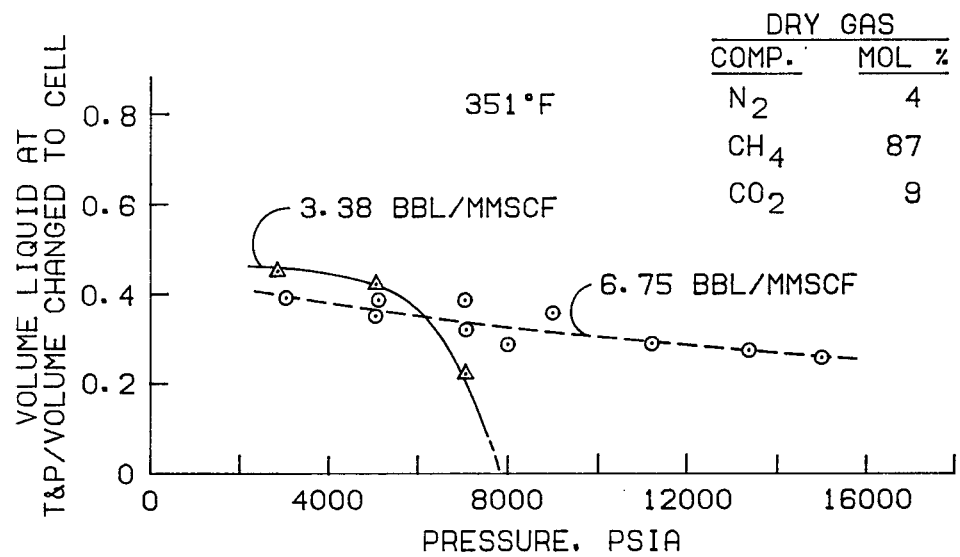
FIG. 2 of the drawing illustrates the volume factor similar to FIG. 1 at 45.1 grams of Duomeen T per 100 grams of disulfide oil.

This particular composition corresponds to 3.38 Bbl oil/MMSCF gas. The PVT cell was held at 351° F. (177° C.) while the volume was varied such that the pressure in the cell ranged from approximately 2,800 psia to 9,000 psia. The test was terminated at the 9,000 psia value because of the disappearance of the liquid phase at these conditions. At this time, a second run was performed at an increased amine activated dialkyl disulfide concentration. The second run involved 6.20 cc of Sample 6 being introduced into the cell at 1600 psia and 105° F. (38° C.) along with 6.091 gm mols of the dry gas of Table VI. This composition corresponds to 6.75 Bbls oil/MMSCF gas. Again, the temperature was held at 351° F. (177° C.) while the pressure ranged from approximately 3,000 psia to 15,000 psia and then back to 3,000 psia. The data for both runs are presented in Table VII and FIG. 2.

TABLE VII

Phase Distribution Test Results for Duomeen T Activated Dialkyl Disulfide Oil with Dry Gas at 351° F.; 45.1 Grams Duomeen T/100 Grams Dialkyl Disulfide

| Pressure, psia | Total Volume, cc | Liquid Volume, cc | Volume Percent Liquid | Volume Liquid at T & P per Volume Oil Charged |
|---|---|---|---|---|
| 3.38 Bbl Oil/MMSCF Gas | | | | |
| 2,874 | 1,308.58 | 1.4 | 0.11 | 0.451 |
| 5,054 | 796.01 | 1.3 | 0.16 | 0.419 |
| 7,040 | 621.59 | 0.7 | 0.11 | 0.226 |
| 9,017 | 530.62 | 0 | 0 | 0 |
| 6.75 Bbl Oil/MMSCF Gas | | | | |
| 3,044 | 1,242.07 | 2.4 | 0.19 | 0.387 |
| 5,098 | 793.09 | 2.4 | 0.30 | 0.387 |
| 7,012 | 625.76 | 2.4 | 0.38 | 0.387 |
| 8,999 | 533.54 | 2.2 | 0.41 | 0.355 |
| 11,179 | 464.69 | 1.8 | 0.39 | 0.290 |
| 13,373 | 431.73 | 1.7 | 0.39 | 0.274 |
| 15,093 | 407.94 | 1.6 | 0.39 | 0.258 |
| 7,987 | 573.18 | 1.8 | 0.31 | 0.290 |
| 7,063 | 621.38 | 2.0 | 0.32 | 0.322 |
| 5,070 | 794.75 | 2.2 | 0.28 | 0.355 |
| 3,034 | 1,245.20 | 2.4 | 0.19 | 0.387 |

In contrast to the previous Sample 5's behavior at 3.38 Bbl/MMSCF wherein a liquid phase was present up to approximately 15,000 psia, the Sample 6 test shows no liquid phase at 3.38 Bbl/MMSCF when pressures of 9,000 psia were achieved. This behavior is further illustrated by comparing FIG. 1 with FIG. 2 and noticing where the 3.38 Bbl/MMSCF curve on FIG. 2 drops to zero. The practical significance of this observation is that the composition of 3.38 Bbls of Sample 6 (i.e., approximate stoichiometric amounts of amine activator) in one MMSCF of gas has an upper pressure limit above which no liquid phase will exist. Consequently, you would not expect the composition of 3.38 Bbls of Sample 6 per one MMSCF of gas to be effective as a corrosion inhibitor or corrosion inhibitor carrier if injected in a dry gas well at a depth that corresponds to a pressure in excess of 9,000 psia. However, this does not means that the composition of Sample 6 is ineffective for purposes of this invention. The second run corresponding to an injection rate of 6.75 Bbl/MMSCF clearly shows significant liquid phase over the entire pressure range of 3,000 to 15,000 psia (see FIG. 2).

From the composite of all phase distribution data presented here, certain basic concepts relative to the practice of the present invention can be estabished. First and foremost, the use of a fatty amine to activate a dialkyl disulfide oil results in compositions which will exist in the liquid phase under the severe high temperature and high pressures associated with the deep dry gas wells of interest. Furthermore, significant volumes of liquid phase can be maintained at bottomhole conditions in the presence of very high rates of dry gas production with as little as 3 to 4 barrels of injected oil/MMSCF of dry gas being produced. Thus it is felt that the use of the fatty amine to activate the dialkyl disulfide oil significantly reduces the volatility of the resulting amine activated dialkyl disulfide oil such that this oil will exist in a liquid phase when injected into deep hot dry gas wells.

When comparing the data related to the 3.38 Bbl/MMSCF run as found in Table VII with the results of the 6.75 Bbl/MMSCF run, it can be concluded that increasing the amount of the amine activated dialkyl disulfide oil not only increases the volume of liquid phase present, but also extends the pressure range at which the required liquid phase will exist to higher pressure values. In other words, as a general rule, increasing the rate of the injection of the amine activated dialkyl disulfide oil will insure the presence of a protective film as the pressure increases.

Comparison of the data found in Table V to that in Table VII shows that an excess of fatty amine activator (over stoichiometry) further enhances the presence of the required liquid phase. As previously stated, further reduction of the volatility of the amine activated dialkyl disulfide, thus additional insurance that the liquid phase will be present, can be achieved by preloading the activated dialkyl disulfide solvent with dissolved elemental sulfur. Such a technique is believed to involve formation of an amine activated dialkyl polysulfide oil which exhibits extremely low volatility at bottomhole conditions of interest.

In order to further enhance the corrosion inhibiting property of the fatty amine activated dialkyl disulfide oil, an effective amount of an oil soluble or oil based corrosion inhibitor can be added to the disulfide oil prior to injection into the well. In this manner the disulfide oil is functioning as a corrosion inhibitor carrier similar to what is commonly practiced in the oil and gas production industry. Acceptable corrosion inhibitors would include, but are not limited to, such additives as organic polar and heteropolar compounds containing nitrogen, oxygen, sulfur and/or other elements in Group V and VI which include amines, amides, mercaptans, heterocyclic nitrogen compounds, ureas, thioureas, phosphates, polyphosphates, oxyalkylates and the like.

The actual injection of the corrosion inhibiting compositions of the present invention can be accomplished by any of the methods commonly practiced in the field for suppressing corrosion or adding additives to downhole fluids. Since the desired liquid phase can be achieved at relatively small volumes of injected disulfide oil, the use of a spaghetti string injection system or the like is preferred.

Having thus described the preferred embodiments, the invention is not be construed as limited to the particular forms disclosed and tested, since these are to be regarded as illustrative rather than restrictive. Therefore, the following claims are intended to cover all processes which do not depart from the spirit and scope of using in high temperature, high pressure gas wells a relatively nonvolatile liquid formed from a dialkyl disulfide oil which was activated by a high molecular weight fatty amine as a corrosion inhibitor or corrosion inhibitor carrier.

We claim:

1. A method for inhibiting corrosion in a high temperature, high pressure gas well, characterized in that an aqueous or brine phase is present, but no petroleum condensate phase exists at a bottomhole conditions, involving the steps of:
    (a) producing a corrosion inhibiting composition capable of existing in a liquid phase at said bottomhole conditions comprising a dialkyl disulfide to which has been added a high molecular weight amine having from about 12 to 30 carbon atoms in a quantity in excess of about 30 parts by weight fatty amine per 100 parts by weight dialkyl disulfide, and
    (b) injecting said corrosion inhibiting composition into said gas well to inhibit corrosion.

2. A method for inhibiting corrosion according to claim 1 wherein said composition has elemental sulfur added to further increase the molecular weight and decrease the volatility of said composition.

3. A method of inhibiting corrosion according to claim 1 or claim 2 wherein said composition contains an oil-soluble corrosion inhibitor.

4. A method for inhibiting corrosion according to claim 1 or claim 2 wherein said amine is a N-alkyl-1,3-propane diamine and said alkyl disulfide is a mixture of dialkyl disulfide wherein the alkyl radical contains from 2 to 11 carbon atoms.

5. A composition capable of existing in a liquid phase and inhibiting corrosion in a high temperature, high pressure well comprising a dialkyl disulfide to which has been added a high molecular weight fatty amine having from about 12 to 30 carbon atoms in a quantity in excess of about 30 parts by weight amine per 100 parts per weight dialkyl disulfide and an effective amount of an oil-soluble corrosion inhibitor.

6. A composition of claim 5 wherein elemental sulfur has been added to further increase the molecular weight and decrease the volatility of said composition.

7. A composition of claim 5 or claim 6 wherein said high molecular weight fatty amine is a N-alkyl-1,3-propane diamine and said dialkyl disulfide is a mixture of dialkyl disulfides wherein the alkyl radical contains from 2 to 11 carbon atoms.

* * * * *

UNITED STATES PATENT OFFICE
CERTIFICATE OF CORRECTION

PATENT NO. : 4,350,600

DATED : September 21, 1982

INVENTOR(S) : Shelby P. Sharp and Lyman Yarborough

It is certified that error appears in the above-identified patent and that said Letters Patent are hereby corrected as shown below:

Column 10, line 52, "means" should read --mean--.
Claim 1, column 12, line 18 after "weight" insert --fatty--.
line 21 after "weight" delete --fatty--.

Signed and Sealed this

Eleventh Day of October 1983

[SEAL]

Attest:

GERALD J. MOSSINGHOFF

Attesting Officer — Commissioner of Patents and Trademarks